United States Patent
Kao et al.

[11] Patent Number: 5,372,691
[45] Date of Patent: Dec. 13, 1994

[54] THERMOCELL

[75] Inventors: Wen-Hong Kao, Brown Deer, Wis.; Norma K. Bullock, Rockwall, Tex.

[73] Assignee: Globe-Union Inc., Milwaukee, Wis.

[21] Appl. No.: 893,371

[22] Filed: Jun. 4, 1992

[51] Int. Cl.$^5$ .............. C25B 9/00; C25B 11/03; C25B 11/06; C25B 13/04

[52] U.S. Cl. .................. 204/265; 204/266; 204/284; 204/291; 204/292; 204/294

[58] Field of Search .......... 204/265, 266, 291–293, 204/294, 284, 129, 248; 429/27, 120

[56] References Cited

U.S. PATENT DOCUMENTS

| | | | |
|---|---|---|---|
| 3,935,029 | 1/1976 | Baker et al. | 136/121 |
| 4,048,383 | 9/1977 | Clifford | 204/129 X |
| 4,104,197 | 8/1978 | Heffler | 252/425.3 |
| 4,336,217 | 6/1982 | Sauer | 264/105 |
| 4,350,608 | 9/1982 | Gestaut | 252/425.3 |
| 4,364,805 | 12/1982 | Rogers | 204/98 |
| 4,456,521 | 6/1984 | Solomon et al. | 204/292 |
| 4,478,696 | 10/1984 | Allen | 204/265 X |
| 4,500,647 | 2/1985 | Solomon | 204/290 R X |
| 4,518,705 | 5/1985 | Solomon et al. | 204/294 X |
| 4,536,272 | 8/1985 | Blanchart et al. | 204/294 |
| 4,696,872 | 9/1987 | Blanchart et al. | 429/42 |
| 4,728,533 | 3/1988 | Feigenbaum et al. | 427/57 |
| 4,885,142 | 12/1989 | Suitor et al. | 204/265 X |
| 4,895,775 | 1/1990 | Kato et al. | 429/41 |
| 4,980,037 | 12/1990 | Hossain et al. | 204/265 X |

*Primary Examiner*—Donald R. Valentine
*Attorney, Agent, or Firm*—Foley & Lardner

[57] ABSTRACT

A thermocell includes a negative electrode, such as a lead-acid electrode, and a porous oxygen (air) electrode disposed in a housing and separated by a separator. During discharge, oxygen is allowed to permeate through the oxygen electrode and separator to reach the negative electrode. Chemical oxidation of the negative electrode by oxygen in the presence of sulfuric acid yields water, lead sulfate, and heat. The heat can be used in many ways, such as warming up an adjoining automotive battery in winter, or as a personal heating pad. The heating rate is controlled by the rate of oxygen ingress. When not in use, the oxygen electrode is sealed by taping or by other means to stop ingress of oxygen. The used thermocell can be recharged by charging the negative electrode while evolving oxygen at the oxygen electrode.

14 Claims, 1 Drawing Sheet

THERMOCELL

TECHNICAL FIELD

This invention relates to electric storage cells, particularly to rechargeable thermocells designed to generate heat.

BACKGROUND OF THE INVENTION

Oxygen electrodes have been used in a variety of battery systems. For example, a well known zinc/potassium hydroxide battery includes a carbon-PTFE oxygen electrode and a Zn/KOH electrode having a separator interposed therebetween. Oxygen from the air enters the oxygen electrode of the battery through an aperture in the positive terminal and permits the discharge reaction to proceed. A PTFE membrane is disposed between the aperture and the oxygen electrode. Such a battery is generally not rechargeable, and is used to power small devices such as watches and the like.

A number of patents describe oxygen cathodes incorporating carbon particles or catalyst particles in a hydrophobic polymer such as PTFE, as a single layer or as a multilayer laminate. See Blanchart et al., U.S. Pat. No. 4,536,272, issued Aug. 20, 1985; Solomon et al., U.S. Pat. No. 4,518,705, issued May 21, 1985; Solomon, U.S. Pat. No. 4,500,647, issued Feb. 19, 1985; Solomon et al., U.S. Pat. No. 4,456,521, issued Jun. 26, 1984; Rogers, U.S. Pat. No. 4,364,805, issued Dec. 21, 1982; and Gestaut, U.S. Pat. No. 4,350,608, issued Sep. 21, 1982. A variety of methods for making oxygen electrodes are known; see, for example, Kato et al., U.S. Pat. No. 4,985,775, issued Jan. 23, 1990; Feigenbaum et al., U.S. Pat. No. 4,728,533, issued Mar. 1, 1988; Blanchart et al., U.S. Pat. No. 4,696,872, issued Sep. 29, 1987; Heffler, U.S. Pat. No. 4,104,197, issued Aug. 1, 1978; Sauer, U.S. Pat. No. 4,336,217, issued Jun. 22, 1982; Baker et al., U.S. Pat. No. 3,935,029, issued Jan. 27, 1976. Known oxygen electrodes have, however, generally been designed to generate electrical energy rather than heat and to participate in the reaction during discharge.

Large lead-acid batteries are commonly used in automobiles and other vehicles for purposes of starting, lighting and ignition (SLI). It is well known that the cranking capacity of a lead-acid battery decreases at lower temperatures, sometimes preventing the battery from having enough power to start the vehicle. This problem is particularly acute in cold climates. The present invention, in one aspect, addresses this problem.

SUMMARY OF THE INVENTION

A thermocell according to the invention includes a negative electrode, such as a metal electrode immersed in an aqueous electrolyte, and a porous oxygen (air) positive electrode disposed in a container and separated by a separator. During discharge, oxygen is allowed to permeate through the oxygen electrode and separator to reach the negative electrode. Chemical oxidation of the negative electrode by oxygen in the presence of sulfuric acid yields water, lead sulfate, and heat. The heat can be used in many ways, such as warming up an adjoining automotive battery in winter, or as a personal heating pad. The heating rate is controlled by the rate of oxygen ingress. When not in use, the oxygen electrode is sealed by taping or by other means to stop ingress of oxygen. The used thermocell can be recharged by charging the negative electrode while evolving oxygen at the oxygen electrode.

According to a further aspect of the invention, a thermocell is used to heat an adjoining lead-acid battery, thereby increasing its temperature and permitting the vehicle to start on a cold day. A battery system according to this embodiment comprises an electrochemical battery including a container provided with external terminals, and an electrochemical thermocell mounted on or near the battery for heating the battery. The thermocell is preferably rechargeable so that it can be connected to the battery terminals and recharged by the alternator once the vehicle has started. A method of starting a motor vehicle with such an electrochemical battery system includes the steps of activating the thermocell to generate heat that warms the battery, starting the motor vehicle by means of an ignition system powered by the warmed battery, and optionally recharging the thermocell after the motor vehicle has started.

BRIEF DESCRIPTION OF THE DRAWINGS

The invention will be described with reference to the accompanying drawings, wherein like numerals denote like elements, and.

DETAILED DESCRIPTION OF PREFERRED EMBODIMENTS

The reaction between lead and oxygen in the presence of sulfuric acid is highly exothermic. The heat generated by this reaction can be used as a heat source in winter to, for example, warm up a car battery or a human body in a cold football stadium. The reactants consumed in the reaction can be restored electrochemically. Thus, by coupling a lead electrode with a porous oxygen electrode or fuel cell electrode, one can build a thermocell or heating pad.

Figure 1:
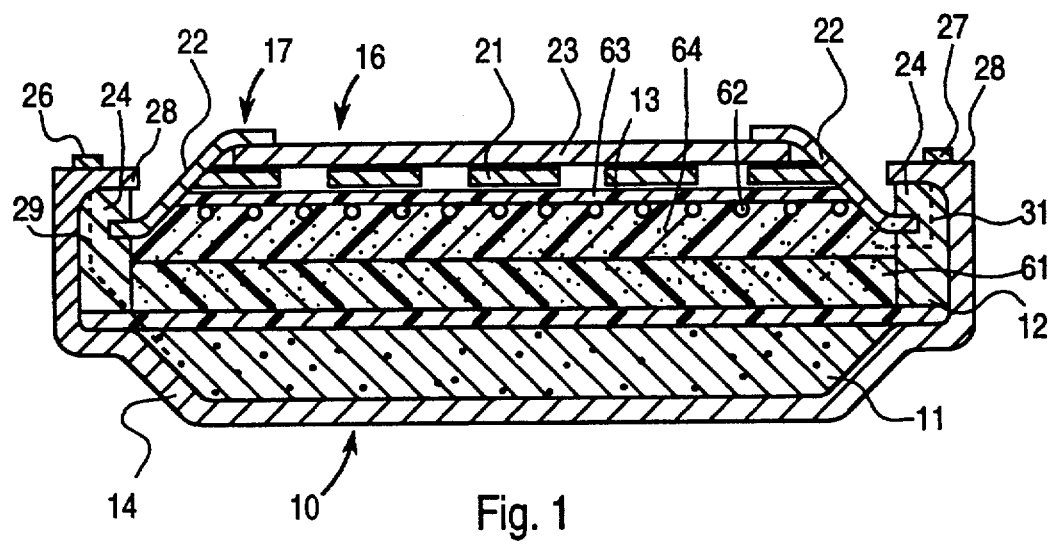
FIG. 1 is a cross-sectional view of a thermocell according to the invention.

Referring to FIG. 1, an exemplary thermocell 10 according to the invention includes a porous lead electrode 11, a separator 12, and an oxygen or fuel cell electrode 13 disposed as successive layers in a rectangular housing 14. Housing 14 has a rectangular opening 16 on the side thereof adjoining oxygen electrode 13. Housing 14 should be heat conductive, but its inner surface must be resistant to sulfuric acid. Accordingly, housing 14 can be made of metal, e.g. steel, lined on the inside with lead or plastic. An all-plastic housing is not preferred because plastics do not transfer heat as readily as metals.

A cover assembly 17 for opening 16 includes a perforated plate 21, retaining flanges 22, a sliding door 23 and a pair of edge seals 24. Flanges 22 are generally Z-shaped in cross-section, as shown. Inner edges of flanges 22 retain the sides of plate 21, whereas the outer edges of flanges 22 are bonded to housing 14 by seals 24. Door 23 fits slidably between flanges 22 and plate 21. A pair of contacts 26, 27 are mounted on the outside of housing 14 at any convenient location, such as on a pair of inward flanges 28 on opposite sides of cover assembly 17. A first electrical connector 29, such as a wire, connects contact 26 to lead electrode 11. A second electrical connector 31 connects contact 27 to oxygen electrode 13. If housing 14 and cover assembly 17 are made of conductive materials and are in direct contact with the lead (negative) electrode 11 and oxygen electrode 13, respectively, housing 14 and cover assembly 17 can be used as electrical contacts for recharge.

Figure 2:
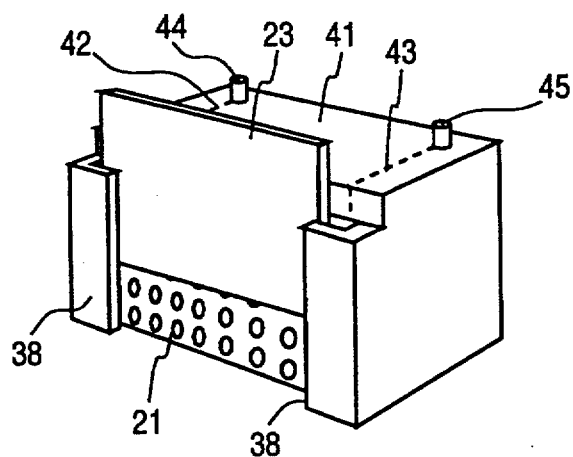
FIG. 2 is a perspective view of a battery system including a lead-acid battery having a thermocell according to FIG. 1 mounted thereon.

During discharge, sliding door 23 is opened as shown in FIG. 2, allowing oxygen from the air to enter thermocell 10 through the holes in perforated plate 21. Porous oxygen electrode 13 allows oxygen to migrate through separator 12 into lead electrode 11 for reaction to generate heat. Thermocell 10 is later recharged to recover lead in the lead compartment and evolve oxygen at the fuel cell or oxygen electrode 13, which oxygen is allowed to escape.

When thermocell 10 is not in use, plate 21 is covered by door 23, or may be sealed by any convenient similar means, such as adhesive tape. Alternatively, thermocell 10 could also be stored in a sealed plastic case or bag to isolate the cell from oxygen. Thermocell 10 is thus portable, and be recharged in a customized charger or by a car battery.

As shown in FIG. 2, thermocell 10 can be built into or mounted on the outside of a conventional lead-acid automotive SLI battery 41 as a heater. In the illustrated embodiment, thermocell 10 slides into position along a side wall of the plastic container of battery 41 and is retained by a pair of L-shaped brackets 38. Brackets 38 are spaced from each other to permit air flow through perforated plate 21 when door 23 slides upwardly as shown. Battery 41 or the car alternator recharges thermocell 10 after the car is started. Electrical connections 42, 43, such as lead bus bars embedded in the battery casing, extend from the positive and negative terminals 44, 45 of battery 41 to each of contacts 26, 27.

The lead electrode can be made of a porous lead active material, such as that used in a lead-acid battery, or a porous lead plaque made by sintering lead powder under pressure and/or heat, with or without a binder such as a polymer (e.g., polyethylene, polypropylene or PTFE.) The lead electrode layer contains lead and an aqueous sulfuric acid electrolyte. During discharging, oxygen permeates through to lead electrode 11 and reacts with the lead and sulfuric acid to form lead sulfate according to the reaction:

$$\tfrac{1}{2}O_2 + Pb + H_2SO_4 = PbSO_4 + H_2O$$

The energy produced by the discharge reaction is dissipated as heat. The reverse reaction occurs during charging.

Figure 3:
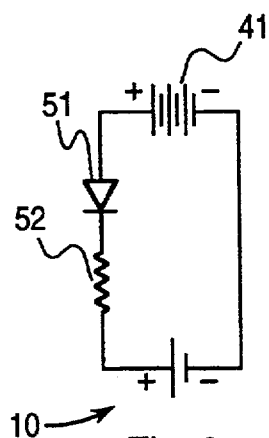
FIG. 3 is an electrical schematic diagram of the battery system of FIG. 2.

Referring to FIG. 3, a diode 51 and resistor 52, which may be provided in a cavity in the battery cover (not shown in FIG. 2), are connected in series to recharge thermocell 10 as described above. Diode 51, however, prevents thermocell 10 from discharging to battery 41, ensuring that the energy from thermocell 10 dissipates as heat. The resistance of resistor 52 is selected to provide a charging voltage limit for the thermocell. On a cold day, battery 41 will absorb heat from thermocell 10 and thereby become warm enough to start the vehicle. For this purpose, thermal insulation can be disposed about thermocell 10.

Any water-wettable and stable porous separator, such as a fiberglass or Celgard mat, can be used as separator 12. The separator must absorb electrolyte and be porous enough to allow oxygen to pass through. For these purposes, separator 12 preferably has a thickness of at least about 1 mil (0.0025 cm) and a porosity of from about 50% to 99%.

The oxygen electrode is conductive and contains a catalyst that reacts with water to evolve oxygen. Porous carbon-oxygen cathodes of the kind used in zinc-/air hearing aid batteries are well known and can be used in a thermocell of the invention as the oxygen electrode. However, carbon is not a good oxygen catalyst in acid. To improve the oxygen cathode's ability to evolve oxygen during recharge of the thermocell, the conductive carbon is supplemented or replaced by a catalyst having a low oxygen overvoltage as described hereafter. The recharging catalyst can be blended into the oxygen electrode, or provided as a separate, third recharging electrode.

Oxygen electrode 13 preferably includes a bottom layer 61 containing catalyst particles distributed in a porous hydrophobic binder such as PTFE, an optional current collector 62, such as a lead grid, overlying catalyst layer 61, and a thin hydrophobic membrane 63 (e.g., PTFE) optionally laminated on top next to perforated plate 21. If the catalyst is a poor conductor, oxygen electrode 13 can also include conductive particles distributed in the porous binder, generally as a conductive layer 64 disposed between membrane 63 and catalyst layer 61.

If the catalyst is poorly conductive or non-conductive, i.e., has a conductivity of less than 10 ohm$^{-1}$cm$^{-1}$, then a preferred oxygen electrode of the invention consists essentially of 10 to 75 wt. % polytetrafluoroethylene (PTFE), 10 to 70 wt. % of the catalyst, and the balance (20 to 80 wt. %) of a conductive filler such as carbon particles. If the catalyst is conductive (conductivity at least 10 ohm$^{-1}$cm$^{-1}$), the amount of catalyst may range from 25 to 90 wt. %, and the filler may be omitted or used in amount less than 20 wt. %.

The catalyst desirably has a low oxygen overvoltage, such as 1.4 V or less, especially 1.2 V or less, particular 0.7 or less when measured against an Hg/HgSO$_4$ reference electrode in dilute sulfuric acid to permit water to react to produce oxygen using less energy. Suitable catalysts include metal oxides, carbides, and nitrides which are stable in sulfuric acid and have a low oxygen overvoltage, such as the following

| Material | Oxygen Overvoltage | Remarks |
| --- | --- | --- |
| MO$_2$C | 0.10 V | Measured |
| NbC | 0.40 V | Measured |
| TiN | 0.53 V | Measured |
| WC | 0.66 V | Measured |
| SiC | 0.75 V | Measured |
| TiC | 0.85 V | Measured |
| Pt | 0.80 V | Estimated |
| MO$_2$Si | 1.00 V | Estimated |
| TaN | 1.20 V | Estimated |
| Carbon | 1.40 V | Estimated |

The porosity and hydrophobicity of the oxygen electrode control the rate of oxygen migration, and thus the heating rate and recharging efficiency of the thermocell. The porosity of oxygen electrode 13 is generally at least 20%, preferably in the range of from 30% to 90%, to maximize these properties. Hydrophobicity is needed to prevent electrolyte from leaking through the oxygen electrode.

A charging unit could be used which would automatically recharge the thermocell in a closed environment, and then reseal it to prevent the ingress of air until time of use. For example, the cell could be inserted into a charger which also has a mechanism heat sealing a plastic bag around the cell after charging, or taping the oxygen inlet on the cell case with a removable tape. This could be done in two stages. A signal such as a light could indicate end of charging, and a pull-through mechanism would then bring the cell through the portion of the unit that would seal the cell.

Metals other than lead can also be used as the active material in the thermocell according to the invention. For example, the oxidation of zinc in KOH is also exothermic. Although a zinc/oxygen thermocell of the invention would be similar in construction to known Zn/oxygen cells, the fuel cell or oxygen electrode in the thermocell of the invention does not participate in discharge. Its role is to regulate ingress of oxygen during discharge and to evolve oxygen during recharge. For these purposes, it must be more porous and more hydrophobic than the oxygen electrode in a zinc/oxygen cell, and have less oxygen overpotential.

According to one example of an oxygen cathode of the invention, tungsten carbide, which evolves oxygen at about 0.66 V against an $Hg/Hg_2SO_4$ reference electrode, was used as the catalyst. Carbon powder and tungsten carbide powder were dispersed in dilute Teflon ®-30 at 60° C. for about 20 minutes. The solid was then filtered and dried. The dried mixture contained about 60% carbon, 10% tungsten carbide, and 30% solid PTFE. The solid mixture was rolled onto a lead expanded metal sheet, then laminated with a GoreTex PTFE film, which was about 78% porous, to complete assembly of the oxygen electrode.

The heating rate of the thermocell may be calculated using the following numeric values and assumptions:
Heat capacity of lead metal: 27.0 J/°C.mol
Heat capacity of lead sulfate: 104 J/°C.mol
Heat capacity of acid (1.305 sp.gr.) 135 J/°C.mol
Heat of reaction: 41.3 kcal/mol
Weight ratio of acid to lead: 2.2
Limiting factor: oxygen ingress
Rate of oxygen ingress: equivalent to 140 $mA/cm^2$
The rate of reaction is calculated, based on the rate of oxygen ingress, to be $3.63 \times 10^{-7}$ $mol/cm^2.sec$. The rate of heat generation is 0.063 $J/cm^2.sec$, or 3.78 $J/cm^2.min$. With a loading of 0.5 $g/cm^2$ lead which is typical in a negative lead-acid plate, the heat capacity of the anodic compartment is 0.71 $J/°C.cm^2$. The initial rate of temperature rise would be 5.3° C./min. The actual temperature of the cell, however, depends on the rate of heat transfer. A cell with 0.5 $g/cm^2$ lead would continue to discharge for about 1 hour at this rate.

The heating rate is directly proportional to the rate of oxygen ingress, or the porosity of the oxygen electrode, and inversely proportional to the lead loading. The heat capacity, however, depends on lead loading. These parameters can be adjusted as needed to control the performance of the thermocell.

It will be understood that the foregoing description is of preferred exemplary embodiments of the invention, and that the invention is not limited to the specific forms shown. For example, other known systems including Fe/KOH, Cd/KOH, and Al/KOH could be used for the thermocell according to the invention. These and other modifications may be made in the design and arrangement of the elements without departing from the scope of the invention as expressed in the appended claims.

What is claim is:

1. A thermocell, comprising:
   a porous, conductive oxygen electrode having a porosity of at least about 20% and containing a catalyst having an oxygen overpotential of about 1.4 or less when measured against an $Hg/HgSO_4$ reference electrode, which oxygen electrode reacts with water in the presence of the catalyst to produce oxygen during charging of the thermocell;
   a metal electrode adapted for immersion in an aqueous electrolyte, which metal electrode reacts in the presence of oxygen to generate heat during discharge of the thermocell; and
   a separator interposed between the oxygen electrode and the metal electrode, which separator is permeable to oxygen; and
   a housing enclosing the electrodes and separator, the housing having an opening therein to permit oxygen to enter and leave the thermocell.

2. The thermocell of claim 1, wherein the housing further comprises a removable covering for the opening.

3. The thermocell of claim 2, wherein the removable covering further comprises a sliding door mounted on the housing.

4. The thermocell of claim 1, wherein the opening is located adjacent to the oxygen electrode on the side thereof opposite from the separator and metal electrode.

5. The thermocell of claim 4, further comprising an air-pervious, hydrophobic membrane interposed between the opening and the oxygen electrode.

6. The thermocell of claim 1, wherein the metal electrode comprises a porous, active lead material adapted for immersion in a sulfuric acid electrolyte.

7. The thermocell of claim 1, wherein the metal electrode comprises a porous, active zinc material adapted for immersion in a potassium hydroxide electrolyte.

8. The thermocell of claim 1, wherein the catalyst consists essentially of one or more metal carbides, nitrides, or oxides.

9. The thermocell of claim 8, wherein the catalyst has a conductivity of less than 10 $ohm^{-1}$ $cm^{-1}$, and the oxygen electrode consists essentially of 10 to 75 wt. % of a hydrophobic polymer, 10 to 70 wt. % of the catalyst, and the balance an electrically conductive filler.

10. The thermocell of claim 9, wherein the metal electrode comprises a porous, active lead material adapted for immersion in a sulfuric acid electrolyte.

11. The thermocell of claim 9, wherein the electrically conductive filler consists essentially of carbon particles.

12. The thermocell of claim 8, wherein the catalyst has a conductivity of at least 10 $ohm^{-1}$ $cm^{-1}$, and the oxygen electrode consists essentially of 10 to 75 wt. % of a hydrophobic polymer and 25 to 90 wt. % of the catalyst.

13. The thermocell of claim 12, wherein the metal electrode comprises a porous, active lead material adapted for immersion in a sulfuric acid electrolyte.

14. The thermocell of claim 8, wherein the catalyst is selected from the group consisting of TaN, $Mo_2C$, NbC, TiN, WC, SiC, TiC, $Mo_2Si$, and combinations thereof.

* * * * *